US007571797B2

(12) United States Patent
Lee

(10) Patent No.: US 7,571,797 B2
(45) Date of Patent: Aug. 11, 2009

(54) NEWEL GUIDE FOR SUPPORTING A HANDRAIL TRAVELING OVER A NEWEL

(75) Inventor: Jin Koo Lee, Anyang-si (KR)

(73) Assignee: Otis Elevator Company, Farmington, CT (US)

( * ) Notice: Subject to any disclaimer, the term of this patent is extended or adjusted under 35 U.S.C. 154(b) by 529 days.

(21) Appl. No.: 10/582,706

(22) PCT Filed: Jan. 13, 2005

(86) PCT No.: PCT/KR2005/000111

§ 371 (c)(1), (2), (4) Date: Jun. 12, 2006

(87) PCT Pub. No.: WO2005/068341

PCT Pub. Date: Jul. 28, 2005

(65) Prior Publication Data

US 2008/0308385 A1 Dec. 18, 2008

(30) Foreign Application Priority Data

Jan. 16, 2004 (KR) ...................... 10-2004-0003204

(51) Int. Cl.
*B65G 15/00* (2006.01)

(52) U.S. Cl. ....................................... 198/335; 198/337

(58) Field of Classification Search ................. 198/321, 198/335–337
See application file for complete search history.

(56) References Cited

U.S. PATENT DOCUMENTS 2,028,358 A * 1/1936 Shonnard .................... 198/337
3,283,878 A * 11/1966 Rissler ........................ 198/335
3,623,589 A * 11/1971 Johnson ....................... 198/335
3,623,590 A * 11/1971 Johnson ....................... 198/337
3,865,225 A * 2/1975 Phal ............................ 198/337
4,836,353 A * 6/1989 Adrian et al. ............... 198/335

(Continued)

OTHER PUBLICATIONS

PCT International Search Report for PCT/KR2005/000111, dated Apr. 20, 2005.

(Continued)

*Primary Examiner*—Gene Crawford
*Assistant Examiner*—William R Harp
(74) *Attorney, Agent, or Firm*—Carlson, Gaskey & Olds PC

(57) ABSTRACT

The present invention provides a newel guide for supporting a handrail, comprising: a friction belt having a closed curved shape and including an outer surface in contact with an internal surface of the handrail; and a support member for supporting an inner surface of the friction belt to allow the friction belt to make an endless continuous movement around the support member. The support member includes a newel frame having a pair of plate members at its upper portion, wherein the plate members are separated from each other and extend in a longitudinal direction of the newel frame. An intermediate guide is mounted on the pair of plate members and has a depressed surface in contact with the inner surface of the friction belt. A pair of joint guides is mounted to the newel frame adjacent to both ends of the intermediate guide, wherein an end of the joint guide provides a support surface for supporting the endless continuous movement of the friction belt.

8 Claims, 4 Drawing Sheets

U.S. PATENT DOCUMENTS

| | | | | | |
|---|---|---|---|---|---|
| 4,852,713 | A | | 8/1989 | Tatai et al. | |
| 4,934,506 | A | * | 6/1990 | Rivera | 198/335 |
| 4,946,020 | A | * | 8/1990 | Rivera et al. | 198/335 |
| 5,033,607 | A | * | 7/1991 | Rivera | 198/335 |
| 5,115,900 | A | * | 5/1992 | Nurnberg et al. | 198/335 |
| 5,117,960 | A | * | 6/1992 | Ahls et al. | 198/335 |
| 5,125,494 | A | * | 6/1992 | Nurnberg et al. | 198/331 |
| 5,131,520 | A | * | 7/1992 | Johnson et al. | 198/335 |
| 5,160,009 | A | | 11/1992 | Iyoda et al. | |
| 5,161,668 | A | | 11/1992 | Datema et al. | |
| 5,226,522 | A | * | 7/1993 | Johnson et al. | 198/335 |
| 5,259,492 | A | * | 11/1993 | Jaminet | 198/335 |
| 5,307,920 | A | * | 5/1994 | Meyer et al. | 198/335 |
| 5,634,546 | A | * | 6/1997 | Ostermeier et al. | 198/335 |
| 6,199,678 | B1 | | 3/2001 | Reo | |
| 7,341,139 | B2 | * | 3/2008 | Aulanko et al. | 198/335 |
| 2006/0070846 | A1 | * | 4/2006 | Andreas et al. | 198/335 |
| 2006/0237284 | A1 | * | 10/2006 | Miessbacher | 198/336 |

OTHER PUBLICATIONS

PCT Written Opinion for PCT/KR2005/000111, dated Apr. 20, 2005.

* cited by examiner

NEWEL GUIDE FOR SUPPORTING A HANDRAIL TRAVELING OVER A NEWEL

TECHNICAL FIELD

The present invention generally relates to passenger conveyors (e.g., escalators or moving walkways), and more particularly to a newel guide for supporting a handrail traveling over a newel of the passenger conveyor.

BACKGROUND ART

Escalators or moving walkways are known as representative examples of passenger conveyors, which can transport humans or articles over a relatively short distance. The escalator is a system in which step-shaped treads and handrails, which are grasped by the hands of the passengers, are automatically put in motion. In the moving walkway, plate-like treads, which are commonly referred to as "pallets," and handrails are automatically driven.

The treads on which humans or articles are carried are continuously put in motion when in operation. The handrail also makes a continuous movement over an edge of a balustrade, which flanks the tread. The endless movements of the treads and handrail should be identical in terms of their moving speed for the safety of the passenger.

An important factor that should be considered in designing these systems is to reduce the noise and vibration when in operation for enhancing the ride of the passenger. This is because the systems include a number of components, which is characterized by, for example, rolling contact movements, rotational movements or sliding contact movements.

In FIG. 1, there is shown a prior art escalator 12. As shown therein, handrail 16 is adapted to accommodate the hands of the passengers. Handrail 16 is retained on an outermost section of a guide 28, which is attached to an edge of balustrade 18, and is moved at the same speed as the steps 14. When handrail 16 moves over the guide 28, frictional resistance is normally exerted to the handrail 16. The resistance is not great in terms of magnitude in the substantial straight section of the handrail 16. However, the resistance is remarkably increased in the curved section of the handrail 16, such as newels 26 of the escalator 12, due to a tension of the handrail 16.

As shown in FIG. 2, one attempt to reduce such frictional resistance is to provide a plurality of rollers 32 to newel 26. However, due to the tension of handrail 16, which is provided to prevent a deviation of handrail 16, the rollers 32 of newel 26 continuously receive a load in one direction.

As shown in FIG. 3, the load exerting in one direction easily damages the journal 54, which supports the shaft 58 of the roller 32, thus resulting in serious noises. Further, after a long-term service, dusts, chips (caused by wearing of the fabrics of an internal surface of the handrail), materials (e.g., particles of rubber or urethane from a driving unit of a handrail), etc., may be accumulated and then become solidified in vacant areas between rollers 32. Furthermore, such materials may enter between the shaft 58 and journal 54 so as to cause rotational problems of rollers 32, serious noises or vibrations.

DISCLOSURE OF THE INVENTION

It is an object of the present invention to provide a newel guide for supporting and guiding a handrail around a newel of a passenger conveyor without using roller assemblies. The newel guide can significantly reduce the frictional resistance, noise or vibration, which may occur during operation.

The objects of the present invention can be achieved by providing a newel guide for supporting a handrail, comprising: a friction belt in a closed curved shape, which has an outer surface that comes in contact with an internal surface of the handrail; and a support means for supporting an inner surface of the friction belt to allow the friction belt to make an endless movement around the support means.

According to one aspect of the present invention, the friction belt includes an inner layer and an outer layer, which has a friction coefficient higher than that of the inner layer.

According to another aspect of the present invention, the support means comprises: a newel frame having a pair of plate members at its upper portion, wherein the plate members are separated from each other and extending in a longitudinal direction of the newel frame; an intermediate guide mounted on the pair of plate members and having a depressed surface, which contacts the inner surface of the friction belt; and a pair of joint guides mounted to the newel frame adjacent to both ends of the intermediate guide, wherein each end of the joint guides provides a support surface for supporting the endless movement of the friction belt.

According to another aspect of the present invention, a passage through which the friction belt travels is formed under the pair of plate members.

According to another aspect of the present invention, the pair of plate members has a slit formed therebetween through which the friction belt is introduced into the passage during an assembling process of the newel guide.

According to yet another aspect of the present invention, the newel frame has a pair of wings extending laterally outwardly from the newel frame and the handrail has a pair of hooks that can fit over the pair of wings.

According to even yet another aspect of the present invention, the end of the joint guide has a curved shape in terms of its cross-section.

According to still yet another aspect of the present invention, the joint guide is fixed to the newel frame by using a thread.

BEST MODE FOR CARRYING OUT THE INVENTION

Herein below, a preferred embodiment of the present newel guide for supporting and guiding a handrail in a passenger conveyor will be described with reference to the accompanying drawings.

Figure 1:
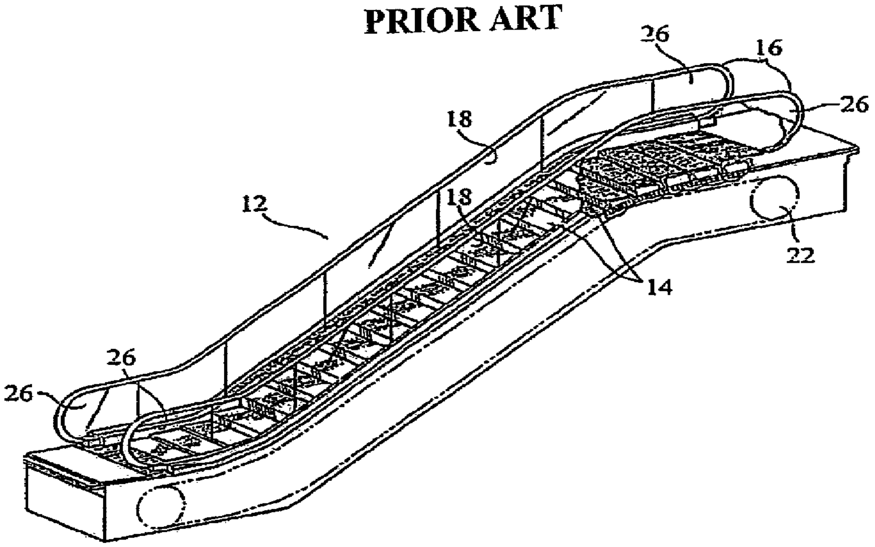
Fig. 1 PRIOR ART
FIG. 1 is a perspective view of the prior art escalator.
Figure 2:
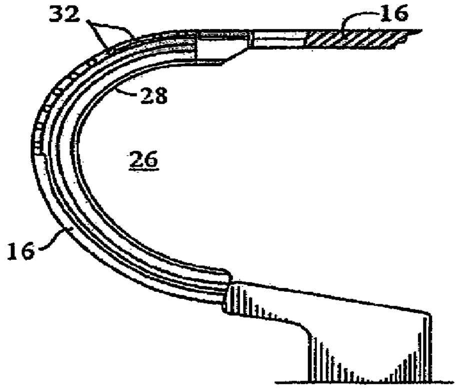
Fig. 2 PRIOR ART
FIG. 2 is a side elevational view of a newel of the escalator shown in FIG. 1.
Figure 3:
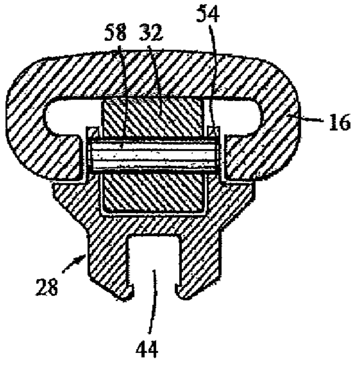
Fig. 3 PRIOR ART
FIG. 3 is a sectional view of the newel of the escalator shown in FIG. 1.

In this description of the present invention, the term "newel" shall mean various sections of the passenger conveyor at which the handrail travels in a curved shape during its continuous movement (e.g., newels 26 formed near an entrance landing and an exit landing of the escalator shown in FIG. 1). The newel may include a section of the passenger conveyors adjacent to a driving pulley (not shown) for moving the handrail, in which the handrail passes by in the curved shape.

Figure 4:
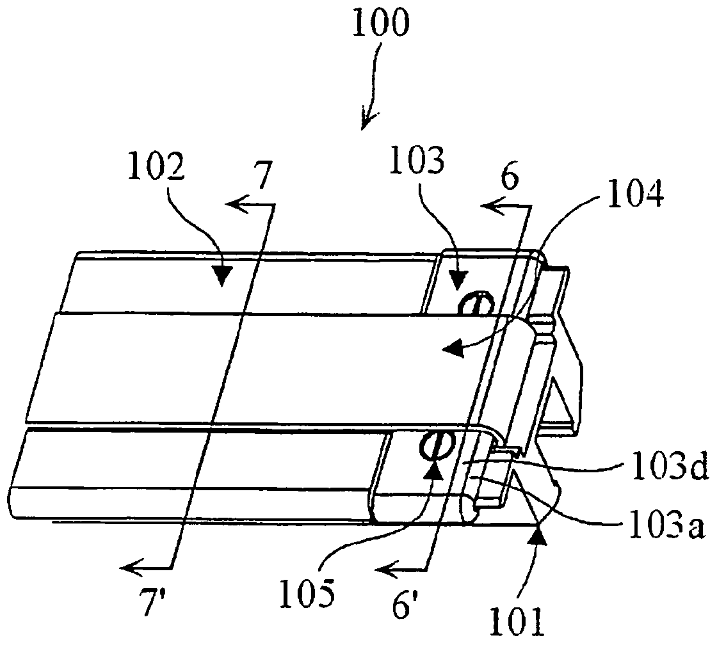
FIG. 4 is a perspective view of a newel guide for supporting and guiding a handrail in accordance with the present invention.
Figure 5:
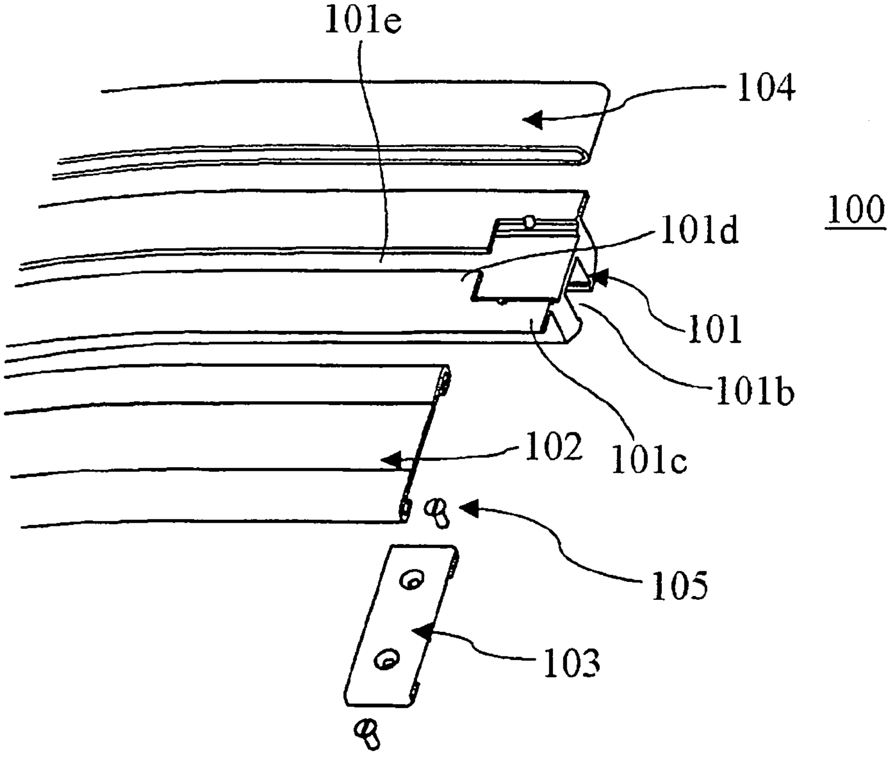
FIG. 5 is an exploded perspective view of the newel guide shown in FIG. 4.

In FIGS. 4 and 5, there is shown a newel guide 100 for supporting and guiding a handrail in accordance with the present invention.

Newel guide 100 includes friction belt 104, newel frame 101, intermediate guide 102 and pair of joint guides 103.

Figure 6:
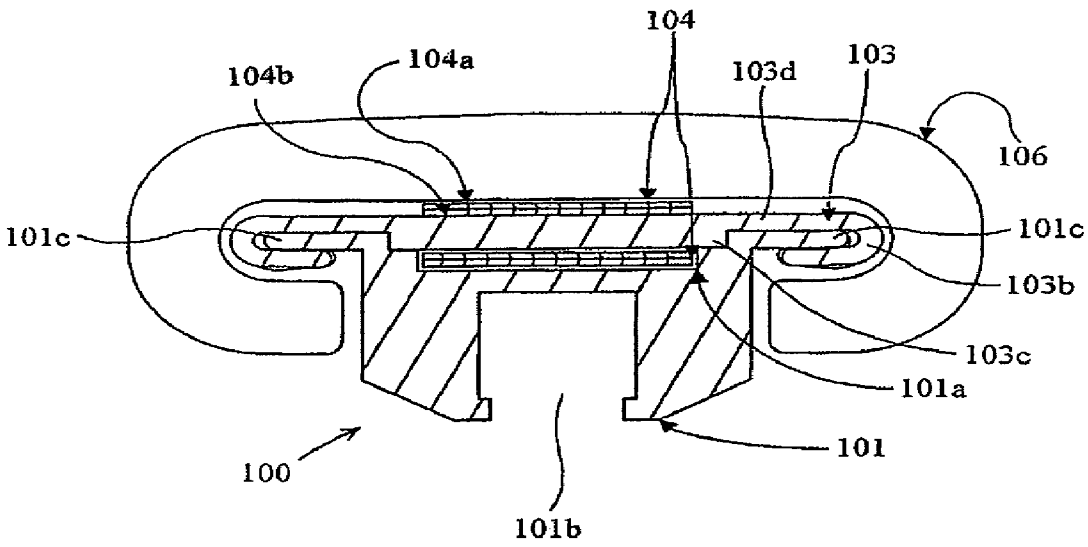
FIG. 6 is a cross-sectional view of the newel guide when taken along a line 6-6' in FIG. 4.

Referring to FIG. 6, friction belt 104 is a member that moves with handrail 106 when it contacts an internal surface of handrail 106. Friction belt 104 makes an endless continuous movement. In the preferred embodiment of the present invention, friction belt 104 has an inner layer 104*b* and an outer layer 104*a* that is integrally formed with the inner layer 104*b*. Outer layer 104*a* has a friction coefficient that is great enough to make it difficult for outer layer 104*a* to slip on the internal surface of handrail 106. As a result, when handrail 106 moves, friction belt 104 is rotated by handrail 106 in a rolling-contact therewith. Inner layer 104*b* comes into a contact with a support member for supporting the endless continuous movement of friction belt 104. To achieve an easier relative movement of friction belt 104 with the support member, inner layer 104*b* has a low friction coefficient.

As a modification, outer layer 104*a* may have a low friction coefficient. In this case, the sliding-contact occurs between the internal surface of handrail 106 and outer layer 104*a*.

As another modification, lubricant may be used between inner layer 104*b* and members 102, 103*d* for supporting inner layer 104*b*, which will be described below in detail, for the relative movement of friction belt 104.

As still yet another modification, friction belt 104 may have two members, i.e., an outer member and an inner member separated from each other and respectively corresponding to the outer layer and the inner layer of the preferred embodiment. The inner member and the outer member are placed in contact with each other in a radial direction. In this case, the outer member, which is also placed in contact with the internal surface of handrail 106, has a great friction coefficient. On the other hand, the inner member, which is placed in contact with the support member for supporting the continuous movement of friction belt, has a low friction coefficient.

The function of the support member for supporting the endless continuous movement of friction belt 104 is implemented through the use of the newel frame 101, intermediate guide 102 and joint guide 103.

Figure 7:
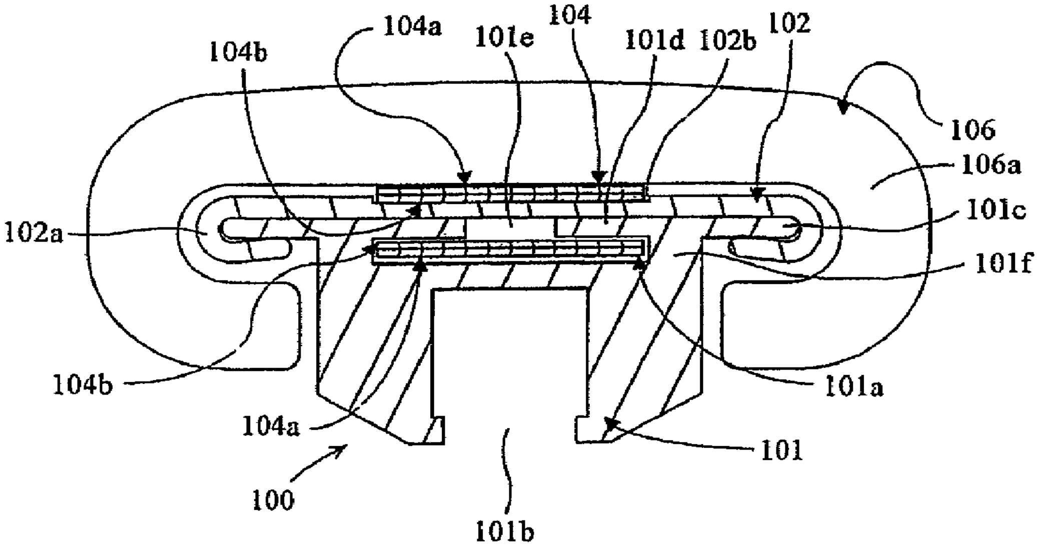
FIG. 7 is a cross-sectional view of the newel guide when taken along a line 7-7' in FIG. 4.
Figure 8:
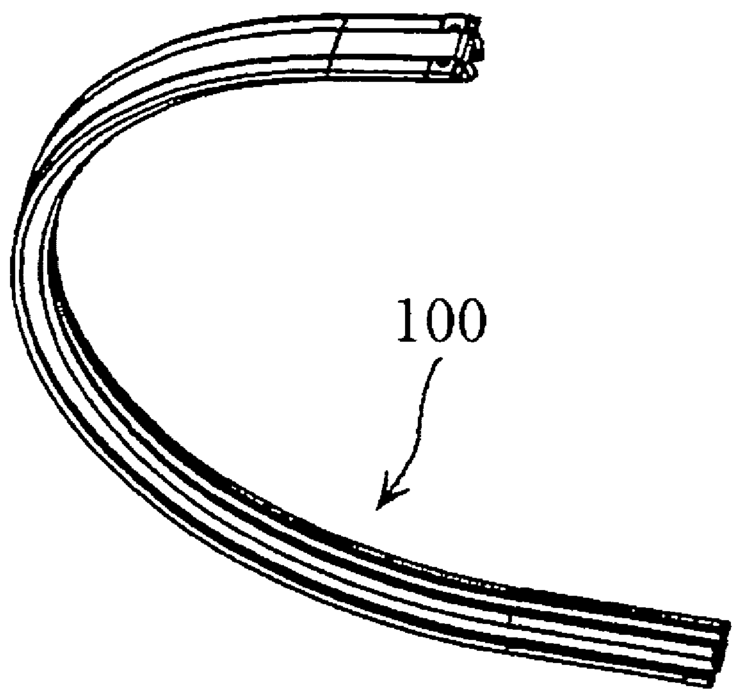
FIG. 8 is a perspective view of the newel guide for the handrail of the present invention in an assembled state.

As shown in FIG. 7, newel frame 101 has recess 101*b* into which a balustrade (not shown) of a newel is fitted. Newel frame 101, whose recess 101*b* is fitted over an edge of the balustrade, provides a base structure for supporting friction belt 104 and handrail 106.

Newel frame 101 also has a pair of sidewalls 101*f* that vertically extends from an upper portion of newel frame 101, a pair of wings 101*c* extending laterally outwardly from ends of sidewalls 101*f*, and a pair of plate members 101*d* extending laterally inwardly from the ends of sidewalls 101*f*. In this configuration, an upper portion of recess 101*b*, a pair of sidewalls 101*i* f, and a pair of plate members 101*d* define a passage 101*a* through which friction belt 104 moves for its endless continuous movement.

Hooks 102*a*, 103*b*, 106*a* of intermediate guide 102, joint guide 103 and handrail 106 are maintained around the pair of wings 101*c* to prevent a deviation of those components 102, 103, 106, especially handrail 106, from newel frame 101. Since the deviation of handrail 106 from newel frame is prevented by fitting hooks 106*a* formed at both ends of handrail 106 over wings 101*c* of newel frame 101 (as described above), there is no need for the tension of handrail 106 to be exceedingly high for the purpose of preventing the deviation of handrail 106.

As shown in FIG. 7, formed between a pair of plate members 101*d* is a slit 101*e* through which friction belt 104 is introduced into passage 101*a* in an assembling process of newel guide 100. A lower surface of plate member 101*d* has a low friction coefficient since it may be contacted with the inner layer 104*b* of friction belt 104. In the preferred embodiment of the present invention, an upper surface of plate member 101*d* is placed in flush with an upper surface of wing 101*c*. However, they may have a different level from each other.

Intermediate guide 102 is mounted on the upper surfaces of wing 101*c* and plate members 101*d*. Intermediate guide 102 has the pair of hooks 102*a* formed at both ends thereof, which are in the shape of wrapping wings 101*c*. Intermediate guide 102 has a depressed surface 102*b* formed at a center of an upper surface of intermediate guide 102, which comes into a contact with inner layer 104*b* of friction belt 104. The depth of depressed surface 102*b* is determined such that only a contact between the outer layer 104*a* of friction belt 104 and the internal surface of handrail 106 is allowed when handrail 106 is completely mounted on the outer layer 104*a* of friction belt 104 positioned in the depressed surface 102*b*. Meanwhile, upper surfaces of the remaining portions of intermediate guide 102 except the depressed surface 102*b* directly face the internal surface of handrail 106 and may be contacted therewith. Therefore, it is desirable for the upper surfaces of intermediate guide 102 including the depressed surface 102*b* to have a low friction coefficient considering the contact with the internal surface of handrail 106 or the contact with the inner layer 104*b* of friction belt 104.

Joint guide 103 is mounted on newel frame 101 adjacent to an end of intermediate guide 102. Since the tension of friction belt 104 becomes different depending on the position of joint guide 103, the joint guide 103 should be positioned on newel guide 101 such that the tension of friction belt 104 is proper for the endless continuous movement.

As shown in FIG. 6, the joint guide 103 is provided with the pair of hooks 103*b* formed at both ends of joint guide 103, while protuberance 103*c* is protruded downwardly from a center of joint guide 103 and upper surface 103*d* is contacted with the inner layer 104*b* of friction belt 104. A lower surface of protuberance 103*c* is also contacted to the inner layer 104*b* of friction belt 104.

Figure 9:
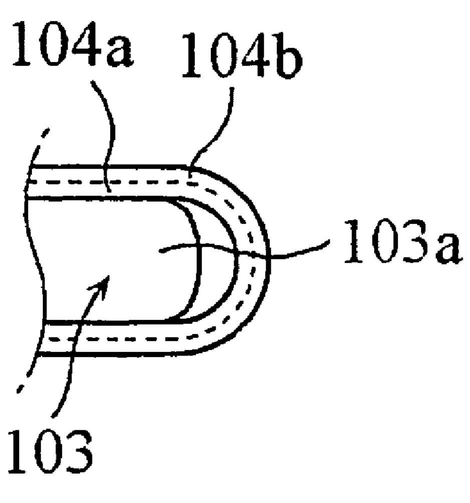
FIG. 9 is a side sectional view of a joint guide engaged with a friction belt.

As shown in FIG. 9, similar to the upper surface 103*d* and the lower surface of protuberance 103*c*, one end 103*a* of joint guide 103 is also contacted with the friction belt 104 at one end of the friction belt 104 at which an advancement direction of friction belt 104 is changed. It is preferable that the end 103*a* of the joint guide 103 has a curved shape in terms of its cross-section. The end 103*a* of joint guide 103 has a low friction coefficient in order to reduce the friction with the frictional belt 104.

As shown in FIG. 5, the joint guide 103 is directly fixed to the newel frame 101 by using a thread 105. As a modification, the joint guide 103 may be fixed to the newel frame 101 with one end of intermediate guide 102 being disposed or sandwiched therebetween.

The operations of the newel guide 100 of the present invention for supporting and guiding the handrail 106 constructed in the above manner will be described herein below.

In the completely assembled state, the friction belt 104 is supported at both ends by a pair of joint guides 103 such that it can travel through a passageway provided by passage 101*a* and depressed surface 102*b*, thus making the endless continuous movement.

When the handrail 106 is moved by a driving pulley (not shown), the friction belt 104, which is placed in contact with the internal surface of handrail 106, moves with the handrail 106 due to the high friction coefficient. At the same time, the inner layer 104*b* of friction belt 104 slides smoothly on the depressed surface 102*b* of intermediate guide 102 and upper surface 103*d* of joint guide 103. Friction belt 104 and handrail 106 starts to be separated on upper surface 103*d* of joint guide 103 during its movement. Thereafter, the friction belt 104 advances toward the other joint guide 103 after passing by the end 103*a* of joint guide 103 and then the lower surface of protuberance 103*c*, thereby making the endless continuous movement. At this time, due to the inner layer 104*b* of friction belt 104 and the portions contacted with the inner layer 104*b*, e.g., the end 103*a* of joint guide 103, the upper surface 103*d* of joint guide 103, the lower surface of protuberance 103*c*, the depressed surface 102*b* of intermediate guide 102 and plate members 101*d*, have a lower friction coefficient and the sliding-contact between them does not cause a high level of resistance against the advancement of friction belt 104, thus resulting in a silent advancement of friction belt 104.

INDUSTRIAL APPLICABILITY

In accordance with the newel guide of the present invention for supporting and guiding the handrail traveling over the newel, since there is no need for the high level of tension to be applied to the handrail for the purpose of preventing a deviation of the handrail, the resistance against the advancement of the handrail can be reduced. Therefore, a driving unit for moving the handrail having a smaller capacity can be used.

The newel guide may provide an enhanced ride compared to the prior art newel guide using rollers since it has a reduced noise and vibration during operation.

Further, the newel guide has an increased service life since it does not have the problems of the prior art newel guide related to the rollers and the peripherals.

The invention claimed is:

1. A newel guide for supporting a handrail, comprising:

a friction belt forwarding a closed loop and including an outer surface supported to be in contact with an internal surface of an associated handrail such that the friction belt moves in response to movement of the handrail; and a support structure for supporting an inner surface of the friction belt to allow the friction belt to make a continuous movement around the support structure.

2. The newel guide of claim 1, wherein said friction belt comprises an inner layer and an outer layer having a friction coefficient higher than that of the inner layer.

3. A newel guide for supporting a handrail, comprising:

a friction belt forming a closed loop and including an outer surface positioned to be in contact with an internal surface of an associated handrail; and a support structure that supports an inner surface of the friction belt to allow the friction belt to make a continuous movement around the support structure, the support structure comprising:

a newel frame having a pair of plate members at an upper portion thereof, the plate members being separated from each other and extending in a longitudinal direction of the newel frame;

an intermediate guide mounted on the pair of plate members and having a depressed surface in contact with the inner surface of the friction belt; and a pair of joint guides mounted to the newel frame adjacent to ends of the intermediate guide, an end of the joint guide providing a support surface for supporting the continuous movement of the friction belt.

4. The newel guide of claim 3, wherein a passage through which the friction belt travels is formed under the pair of plate members.

5. The newel guide of claim 4, wherein the pair of plate members has a slit formed therebetween through which the friction belt is introduced into the passage in an assembling process of the newel guide.

6. The newel guide of claim 3, wherein the newel frame has a pair of wings extending laterally outwardly from the newel frame and the handrail has a pair of hooks fittable over the pair of wings.

7. The newel guide of claim 3, wherein the end of the joint guide has a curved shape in its cross-section.

8. The newel guide of claim 3, wherein the joint guide is fixed to the newel frame by using a thread.

* * * * *

UNITED STATES PATENT AND TRADEMARK OFFICE

CERTIFICATE OF CORRECTION

PATENT NO. : 7,571,797 B2
APPLICATION NO. : 10/582706
DATED : August 11, 2009
INVENTOR(S) : Jin Koo Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 589 days.

Signed and Sealed this

Seventh Day of September, 2010

David J. Kappos

*Director of the United States Patent and Trademark Office*